United States Patent Office 3,843,484
Patented Oct. 22, 1974

3,843,484
METHOD OF BONDING SYNTHETIC FIBROUS MATERIAL TO RUBBER USING AN AQUEOUS DISPERSION-TYPE ADHESIVE
Masaya Kamiyoshi, Masatoshi Gouda, and Naoya Kuramoto, Iwakuni, Japan, assignors to Teijin Limited, Osaka, Japan
No Drawing. Filed June 20, 1972, Ser. No. 264,467
Int. Cl. B32b 25/02, 25//08; C09j 5/00
U.S. Cl. 156—335                        8 Claims

ABSTRACT OF THE DISCLOSURE

A method of bonding a synthetic fibrous material to rubber with outstandingly high bond strength, which comprises coating a synthetic fibrous material with an aqueous dispersion comprising (A) a novolak resin derived from 1 mol of a monohydroxy benzene having two or more functional groups or its derivative, in which the ratio of the number of benzene rings to that of hydroxyl groups in the molecule is 1:1, and 0.3 to 1 mol of formaldehyde, (B) 0.05 to 1 part by weight per part of said resin (A), of a resol-type precondensate derived from 1 mol of resorcinol and 1 to 6 mols of formaldehyde, and (C) ½ to 9 parts by weight per part by weight of the sum of said resin (A) and precondensate (B), of a rubber latex, curing the coating at a temperature of at least 100° C. but not higher than the softening point of the fibrous material, and bonding the fibrous material to an unvulcanized rubber material while vulcanizing, and the aqueous dispersion-type adhesive therefor.

---

This invention relates to a method of bonding a synthetic fibrous material to rubber with outstandingly high bond strength, and an aqueous dispersion-type adhesive used in such a method.

A mixture of a resorcinol-formaldehyde precondensate and a rubber latex (abbreviated as RFL) has been used for bonding a synthetic fibrous material such as a polyester, typically, nylon, to rubber. But with RFL alone, satisfactory results cannot be obtained in the bonding. Good bonding requires pretreatment of the fibers with a known adhesive such as those of the epoxy or isocyanate types before the application of RFL. On the other hand, monobath adhesives for polyester fibers, such as (1) a mixture of a methylolated polyhydric phenol-blocked isocyanate and rubber latex, (2) a mixture of isocyanate, vinyl chloride and rubber latex, or (3) a mixture of phenol-blocked isocyanate, epoxy and rubber latex, do not give satisfactory results in the bonding of rayon, nylon and polyvinyl alcohol fibers to rubber.

Recently, there has been proposed an adhesive comprising a polymer latex, a resol resin and a novolak resin which is useful for bonding a synthetic fibrous material such as polyester fibers to rubber (United States Patent 3,547,729).

In this U.S. patent, a linear water-soluble resin derived from resorcinol and formaldehyde is used as the novolak resin, and it is stated that other aldehydes such as acetaldehyde, chloral, etc. and other phenols such as phenol, pyrogallol, etc. may be used in amounts which do not interfere with the water-solubility of the resin. The patent does not at all disclose the utilization of a novolak resin not containing resorcinol. According to the Examples, the bond strength attained by this patent was about 13 kg./cm.² ["H" test pulled at 230° F. (110° C.)] at most.

The subject inventors performed continued and extensive work for long years on an adhesive which can effect firm bonding between synthetic fibrous materials such as polyester fibers to rubber by treating the fibrous materials by the mono-bath method and a method of bonding using such an adhesive. It was found that a synthetic fibrous material can be bonded to rubber with greatly improved bond strength by using a novolak resin obtained by the reaction of a polyfunctional monohydroxy benzene or its derivative having the mol ratio of the number of benzene rings to the hydroxyl groups in the molecule, such as phenol, cresol, xylenol, halogenated phenol, or bis phenol with formaldehyde in a specific range. This is instead of a novolak resin derived from a polyfunctional monohydroxy benzene or its derivative in which the ratio of the number of benzene rings to that of hydroxyl groups is 1:2 such as resorcinol and formaldehyde.

We have also found that if an aqueous dispersion of such a novolak resin is used as an adhesive, synthetic fibrous materials such as polyesters or polyamides can be bonded to rubber with sufficiently high bond strength without the necessity of choosing an oil to be applied to the surface of the fibrous material which does not adversely affect adhesion between rubber and the fibrous material. It has also been found that using such an adhesive, rubber can be bonded with high bond strength to a polyester having a low carboxyl terminal group content such as less than 20 g. equivalent/10⁶ g. and having excellent properties at high temperatures in the presence of water. The bonding of such a polyester to rubber has been especially difficult previously.

An object of this invention is to provide a method of bonding a synthetic fibrous material to rubber with remarkably improved bond strength.

Another object of this invention is to provide an adhesive for use in such bonding.

Many other objects of this invention along with its advantages will become more apparent from the following description.

One aspect of this invention relates to a method of bonding a synthetic fibrous material to rubber, which comprises coating a synthetic fibrous material with an aqueous dispersion comprising (A) a novolak resin derived from 1 mol of monohydroxy benzene having two or more functional groups or its derivative, in which the ratio of the number of benzene rings to that of hydroxyl groups in the molecule is 1:1, and 0.3 to 1 mol, preferably 0.7 to 0.95 mol of formaldehyde, (B) 0.05 to 1 part by weight, preferably 0.1 to 0.5 part by weight, per part of said resin (A), of a resol-type precondensate derived from 1 mol of resorcinol and 1 to 6 mols, preferably 1.2 to 2.0 mols, of formaldehyde, and (C) ½ to 9 parts by weight, preferably 1 to 3 parts by weight, per part by weight of the sum of said resin (A) and precondensate (B), of a rubber latex, curing the coating at a temperature of at least 100° C. but not higher than the softening point of the fibrous material, and bonding the fibrous material to an unvulcanized rubber material while vulcanizing.

Another aspect of this invention is an adhesive in the form of an aqueous dispersion for use in bonding synthetic fibers to rubber, said adhesive comprising (A) a novolak-type resin derived from a monohydroxy benzene containing 2 or more functional groups or its derivative in which the ratio of the number of benzene rings to that of hydroxyl groups in the molecule is 1:1, and 0.3 to 1 mol, preferably 0.7 to 0.95 mol, of formaldehyde, (B) 0.05 to 1 part by weight, preferably 0.1 to 0.5 part by weight, per part by weight of said resin (A), of a resol-type precondensate derived from 1 mol of resorcinol and 1 to 6 mols, preferably 1.2 to 2.0 mols, of formaldehyde, and (C) ½ to 9 parts by weight, preferably 1 to 3 parts by weight, based on one part of the sum of the amounts of said resin (A) and precondensate (B) of a rubber latex, the amount of said aqueous dispersion being 10 to 25% by weight as solids content.

Polyester fibrous materials are most suitable as the synthetic fibrous article to which the present invention is applied, but other fibrous materials such as polyamides, polyvinyl, polyacrylonitrile and polyolefins can also be utilized.

The form of the synthetic fibrous material can be varied over a wide range, and includes, for example, filaments, yarns, cords, tows, strands, tapes, sheets, woven fabrics, knitted fabrics, non-woven fabrics or felts.

Examples of the monohydroxy benzene or its derivative to be used for preparing the novolak resin (A) are those of the formulae (1) and (2) below:

(1) Phenols of the formula:

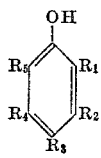
(1)

wherein each $R_1$ through $R_5$ is a hydrogen atom, an alkyl group containing 1 to 15 carbon atoms, preferably 1 to 4 carbon atoms, or a halogen atom, preferably chlorine and bromine, and at least two of $R_1$, $R_3$ and $R_5$ are hydrogen atoms.

(2) Monohydroxybenzene derivatives of the formula:

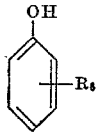
(2)

wherein $R_6$ is a group selected from a hydroxyphenol group and

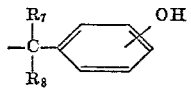

wherein each of $R_7$ and $R_8$ is a hydrogen atom or an alkyl group having 1 to 10 carbon atoms, preferably 1 to 4 carbon atoms.

Specific examples of the monohydroxy benzene or derivatives thereof include phenol, o-cresol, m-cresol, p-cresol, o-chlorophenol, m-chlorophenol, p-chlorophenol, part-t-butylphenol, 2,3-xylenol, 3,4-xylenol, 4,4'-dihyroxybiphenyl, 2,2'-dihydroxy biphenyl, bis-(4-hydroxyphenyl) methane, o,p'-methylene biphenyl, o,o'-methylene biphenol, bis-(4-hydroxyphenyl) dimethyl methane [bisphenol A], and p,p'-sec. butylidenediphenol [bisphenol B].

The method of producing novolak resin (A) is known, and involves condensing the monohydroxy benzene or its derivative with formaldehyde in the presence of an acid catalyst.

If in the above-mentioned novolak resin (A), the ratio of formaldehyde is less than 0.3, the cohesive force is insufficient, and if it exceeds 1.0, a branched or cross-linked resin tends to be formed and becomes difficult to disperse in water. This results in substantial reduction in bond strength. As will be shown by comparative examples in Table II, the improving effect in accordance with the present invention cannot be obtained.

The resol-type precondensate (B) used in this invention can also be produced by conventional methods, for example, condensing resorcinol with formaldehyde in the presence of an alkali catalyst.

If the mol ratio of formaldehyde in the precondensate is too small or large beyond the above-specified mol ratio range, the improving effect of this invention can not be obtained as will be shown in Table III by comparative examples.

If the mixing ratio between the novolak resin (A) and the resol-type precondensate (B) is less than 1:0.05, the cohesive force of the mixture is insufficient. When the ratio exceeds 1:1, the resulting aqueous dispersion adhesive has poor wetting property towards a synthetic fibrous material of low polarity, for example polyester fibers, and is reduced in bond strength. In this case also, the improving effect of this invention cannot be obtained as will be shown in Table I below by comparative examples.

The rubber latex (C) used in this invention is a rubber latex selected from the group consisting of natural rubber latices, vinyl pyridine/styrene/butadiene copolymer latex, styrene/butadiene copolymer latex, butyl rubber latex, polybutadiene latex, acrylonitrile/butadiene copolymer latex, polychloroprene latex, carboxy-modified polybutadiene latex, hydroxy-modified polybutadiene latex and polyvinyl chloride latex. Especially preferred rubber latices are vinyl pyridine/styrene/butadiene copolymer latex, and mixtures of said copolymer latex with natural rubber latex, styrene/butadiene copolymer latex, butyl rubber latex, polybutadiene latex, acrylonitrile/butadiene copolymer latex, polychloroprene latex, carboxyl-modified polybutadiene latex, hydroxyl-modified polybutadiene latex and polyvinyl chloride latex.

If the proportion of the rubber latex (C) based on the sum of the resin (A) and precondensate (B) becomes too small or large beyond the above-specified range, the improving effect of this invention cannot be achieved as will be shown in Table I by comparative examples.

The aqueous dispersion adhesive in accordance with this invention contains an adhesive component consisting of the novolak resin (A), resol-type precondensate (B) and rubber latex (C) in an amount of 10 to 25% by weight calculated as solids content.

The aqueous dispersion adhesive of this invention can be obtained by dispersing novolak resin (A) in water using a solvent such as alcohols or acetone and/or an anionic emulsifier, and then mixing the dispersion with a mixture of the resorcinol-formaldehyde precondensate (B) and the rubber latex (C).

Most frequently, sodium dodecylbenzenesulfonate or its derivative of the formula

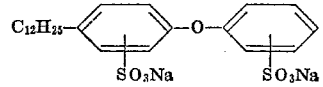

is used as the anionic emulsifier.

According to the method of bonding in this invention, a synthetic fibrous material is coated with the aqueous dispersion adhesive described above to adhere the adhesive to the material. This can be accomplished by suitable means such as brush coating, spraying, immersion or roll coating.

The resin take-up can be selected suitably according to the shape of the synthetic fibrous material, the use of the product, etc. so as to give good bonding between the fibrous material and rubber. For example, 1 to 12% by weight, preferably 6 to 10% by weight, based on the weight of the fiber (as the solids content of the adhesive component) can be applied. The treated synthetic fibrous material is then heat-cured at a temperature of at least 100° C. but not exceeding the softening point of the fibrous material.

The synthetic fibrous material so treated is then contacted with unvulcanized rubber, and then the rubber is vulcanized to yield a good rubber product.

Rubbers to be bonded to the synthetic fibrous material in accordance with this invention include, for example, natural rubbers such as hevea, guttapercha or balata, modified rubber such as hydroxyl-modified rubber, and synthetic rubbers such as neoprene or styrene/butadiene copolymer rubber.

The invention will be specifically illustrated by the following Examples and Comparative Examples.

EXAMPLE 1

(A) Preparation of Novolak-Type Phenol/Formaldehyde Resin

A reaction vessel equipped with a reflux condenser and a stirrer was charged with 940 gr. (10 mols) of phenol, 730 gr. (9 mols) of formalin (37% aqueous formaldehyde solution) and 35 ml. of 4N sulfuric acid. The temperature was raised to 110° C. over one hour, and then the phenol and the formalin were reacted under reflux for 2 hours. The temperature was then raised to 140° C., and the condensation reaction of these compounds was performed for 2 hours while evaporating off water.

200 gr. of the resin obtained was dissolved in 300 gr. of methanol, and 120 gr. of a 10% wt. aqueous solution of sodium hydroxide was added. Subsequently, 380 gr. of water was added to form 1 kg. (solids content 20% by weight) of a methanol-water solution of the novolak-type phenol formaldehyde resin. (Solution A).

(B) Preparation of the Resol-Type Resorcinol-Formaldehyde Precondensate 144 gr. (1.31 mols) of resorcinol was dissolved in 620 gr. of water, and then 156 gr. (1.92 mols) of formalin was added. The solution obtained was cooled to 15° C. Thereafter, 80 gr. of a 10 wt. percent aqueous solution of sodium hydroxide was added, and the mixed solution was aged at 20° C. for 5 hours to form 1 kg. (solids content 20% by weight) of an aqueous solution of the resol-type resorcinol/formaldehyde precondensate. (Solution B).

(C) Preparation of Rubber Latex 350 gr. of Hycar 2518 FS® (40 wt. percent vinylpyridiene/styrene/butadiene copolymer latex) and 150 gr. of Nipol LX–110® (40 wt. percent styrene/butadiene copolymer latex) were mixed with 500 gr. of water to form 1 kg. (solids content 20% by weight) of a rubber latex. (Solution C).

(D) Preparation of Resol-Type Phenol/Formaldehyde Resin

A reaction vessel equipped with a reflux condenser and a stirrer was charged with 940 gr. (10 mols) of phenol. 1620 gr. (20 mols) of formalin and 200 gr. of a 10 wt. percent aqueous solution of sodium hydroxide. The temperature was raised to 110° C. in the course of one hour, and then the phenol and formalin were reacted under reflux for one hour at 110° C. The temperature was then raised to 140° C., and these compounds were condensed for 2 hours while evaporating off water to form a resol-type phenol/formaldehyde resin.

200 gr. of the resin obtained was dissolved in 150 gr. of methanol, and then 50 gr. of a 10 wt. percent aqueous solution of sodium hydroxide and 600 gr. of water were added to form 1 kg. (solids content 20% by weight) of a methanol water solution of the resol-type phenol/formaldehyde resin. (Solution D).

(E) Preparation of Novolak-Type Resorcinol-Formaldehyde Resin

A reaction vessel equipped with a reflux condenser and a stirrer was charged with 167 gr. (1.52 mols) of resorcinol and 38 gr. (0.47 mol) of formalin. The temperature was raised to 95° C. in the course of an hour, and the mixture was stirred at 95° C. for 1 hour. 50 gr. (0.62 mol) of formalin was further added in the course of 20 minutes. Then, 1.5 gr. of oxalic acid was added, and the reaction was performed for 2 hours at 95° C. While stirring the reaction product, 560 gr. of water was added gradually in the course of 20 minutes. The contents were cooled to below 40° C., and finally 185 gr. of 28 wt. percent aqueous ammonia was added in the course of 20 hours to form 1 kg. (solids content 20% by weight) of an aqueous solution of the novolak-type resorcinol/formaldehyde resin. (Solution E).

(F) Preparation of Novolak-Type Phenol/Resorcinol/Formaldehyde Copolymer Resin

A reaction vessel equipped with a reflux condenser and a stirrer was charged with 94 gr. (1.0 mol) of phenol, 108 gr. (1.33 mols) of formalin and 3 mols of sulfuric acid (4N). The temperature was raised at 110° C. in the course of one hour, and then the phenol and formalin were reacted for 2 hours under reflux at 110° C. The reaction product was cooled to 60° C., and a solution of 66 gr. (0.6 mol) of resorcinol in 300 gr. of methanol was added dropwise over a period of 30 minutes. Then, the temperature was raised to 80° C., and the reaction was performed under reflux at this temperature for 2 hours.

120 gr. of a 10 wt. percent aqueous solution of sodium hydroxide was added to the resulting resin solution, and then 310 gr. of water was added. There was obtained 1 kg. (solids content 20% by weight) of a methanol-water solution of a novolak-type phenol/resorcinol/formaldehyde copolymer resin. (Solution F).

EXAMPLE 2

The resol-type resin aqueous solution (solutions B and C) were mixed with a stirring with the rubber latex (solution C) obtained in Example 1 in the proportions shown in Table Ia. The mixture was then aged at 20° C. for 48 hours. The resulting mixture was designated as RFL.

The novolak-type resin aqueous solutions (solutions A, E and F) obtained in Example 1 were added in the proportions shown in Table Ia to the RFL to form adhesive aqueous dispersions having a solids content of 20% by weight.

A polyethylene terephthalate tire cord (1000 denier/3-ply, number of twists 40 x 40 turns/10 cm., pick-up of the finishing composition about 0.6% by weight) having the terminal carboxyl content and the oil component shown below was continuously dipped in each of the adhesive dispersions, dried for 2 minutes at 120° C. by means of a Computreater® (trademark for a dipping machine), and heat-treated for 1 minute at 240° C.

| Tire cords | Terminal carboxyl group content (g. eq./10$^6$ g.) | Oil |
|---|---|---|
| T1 | 28 | X |
| T2 | 28 | Y |
| T3 | 18 | X |

The terminal carboxyl content was measured in accordance with the method described in A. Conix: Makromolecular Chemie, 26, 226 (1958). The constituents of the oil were as follows:

FINISHING COMPOSITION X

Ingredients:                     Parts (by weight)
 Mineral oil _____ 60
 Polyoxyethylene(3) laurylamine _____ 20
 Polyoxyethylene oleyl ether _____ 15
 Dioctyl sulfosuccinate _____ 5

FINISHING COMPOSITION Y

Ingredients:                     Parts (by weight)
 Mineral oil _____ 60
 Triethanolamine _____ 10
 Oleic acid _____ 10
 Sulfonated castor oil _____ 15
 Doictyl sulfosuccinate _____ 3
 Oleic alcohol _____ 2

Each of the tire cords treated was embedded in a rubber compound of the following recipe, and the vulcanization was performed for 30 minutes at 150° C.

RECIPE OF THE RUBBER COMPOUND

Ingredients:                     Parts (by weight)
 Natural rubber _____ 100
 Sulfur _____ 3
 Zinc oxide _____ 5
 Carbon black _____ 50
 Stearic acid _____ 3
 Pine tar _____ 5
 Accelerator M (mercaptobenzothiazole) _____ 1
 Antioxidant A (aldol-α-naphthylamine) _____ 1

Using each of the bonded articles, the bond strength of each cord at 20° C. was measured in accordance with ASTM D 2138–63T by means of the H-test (embedded length 10 mm.) and the T-striping test (stripping speed 30 cm./min.) by means of an Instron® tensile tester. The results are shown in Table I below.

TABLE Ia

| Run No. | Novolak resin solution (gr.) | Resol resin solution (gr.) | Rubber latex (gr.) | Novolak:resol (ratio) | Novolak plus resol:rubber (ratio) |
|---|---|---|---|---|---|
| 1 | A 50 | — | 0 C | 100 | 1:0 | 1:2 |
| 2 | A 47.5 | B 2.5 | C 100 | 1:0.055 | 1:2 |
| 3 | A 45 | B 5 | C 100 | 1:0.11 | 1:2 |
| 4 | A 40 | B 10 | C 100 | 1:0.25 | 1:2 |
| 5 | A 35 | B 15 | C 100 | 1:0.43 | 1:2 |
| 6 | A 25 | B 25 | C 100 | 1:1.0 | 1:2 |
| 7 | A 20 | B 30 | C 100 | 1:1.5 | 1:2 |
| 8 | A 15 | B 35 | C 100 | 1:2.3 | 1:2 |
| 9 | — | B 50 | C 100 | 0:1 | 1:2 |
| 10 | — | B 50 | C 250 | 0:1 | 1:5 |
| 11 | A 40 | D 10 | C 100 | 1:0.25 | 1:2 |
| 12 | — | {D 40, B 10} | C 100 | 0:1 | 1:2 |
| 13 | E 40 | B 10 | C 100 | 1:0.25 | 1:2 |
| 14 | E 40 | B 10 | C 35 | 1:0.25 | 1:0.7 |
| 15 | {A 20, B 20} | | C 100 | 1:0.25 | 1:2 |
| 16 | {A 20, E 20} | B | C 35 | 1:0.25 | 1:0.7 |
| 17 | F 40 | B 10 | C 100 | 1:0.25 | 1:2 |
| 18 | F 40 | B 10 | C 35 | 1:0.25 | 1:0.7 |
| 19 | A 40 | B 10 | — 0 | 1:0.25 | 1:0 |
| 20 | A 40 | B 10 | C 15 | 1:0.25 | 1:0.3 |
| 21 | A 40 | B 10 | C 30 | 1:0.25 | 1:0.6 |
| 22 | A 40 | B 10 | C 60 | 1:0.25 | 1:1.2 |
| 23 | A 40 | B 10 | C 150 | 1:0.25 | 1:3 |
| 24 | A 40 | B 10 | C 250 | 1:0.25 | 1:5 |
| 25 | A 40 | B 10 | C 500 | 1:0.25 | 1:10 |

TABLE Ib

| Run number | H-test (kg./cm.) | | |
|---|---|---|---|
| | T1 | T2 | T3 |
| 1 | 14.8 | 14.7 | 14.5 |
| 2 | 17.0 | 17.3 | 17.4 |
| 3 | 18.1 | 18.3 | 18.0 |
| 4 | 18.6 | 18.5 | 19.1 |
| 5 | 18.0 | 18.9 | 18.8 |
| 6 | 17.3 | 16.8 | 17.1 |
| 7 | 14.3 | 12.4 | 11.5 |
| 8 | 11.8 | 10.3 | 12.1 |
| 9 | Gelled | Gelled | Gelled |
| 10 | 8.6 | 10.1 | 9.3 |
| 11 | 11.3 | 11.4 | 10.3 |
| 12 | 10.2 | 9.8 | 8.6 |
| 13 | 13.8 | 11.7 | 11.3 |
| 14 | 15.8 | 12.1 | 13.6 |
| 15 | 15.9 | 13.8 | 13.5 |
| 16 | 15.8 | 14.1 | 13.6 |
| 17 | 14.3 | 12.8 | 13.5 |
| 18 | 14.8 | 13.7 | 13.9 |
| 19 | 5.6 | 3.7 | 6.4 |
| 20 | Gelled | Gelled | Gelled |
| 21 | 16.2 | 17.3 | 17.0 |
| 22 | 18.3 | 18.8 | 18.9 |
| 23 | 17.8 | 17.5 | 18.0 |
| 24 | 17.0 | 16.9 | 17.1 |
| 25 | 13.6 | 12.8 | 13.3 |

It can be seen from the results shown in Tables Ia and Ib that the aqueous dispersion adhesive of this invention gives rise to bonding of high strength irrespective of the terminal carboxyl content of the polyethylene terephthalate fibers and the constituents of the oil applied to the fibers.

The adhesives (Runs Nos. 2 to 6) of this invention which contained the novolak phenol formaldehyde resin (A), the resol resorcinol-formaledhyde resin (B) which has high heat-curing reactivity, and also the rubber latex (C) exhibit higher bond strength than the adhesive (1) which contains the rubber latex (C) and the novolak phenol-formaldehyde resin (A) having no heat-curing reactivity.

On the other hand, RFL adhesives (Runs Nos. 9 and 10) containing novolak resin (A) are unstable and tend to be gel if the amount of the resin component is large. Therefore, usually RFL containing a large proportion of the rubber latex (C) (Run No. 10) is used, but this exhibits only very low bond strength to polyester.

Accordingly, adhesive liquids (Runs Nos. 7 and 8) containing resin B in a larger proportion than resin A show only low bond strength.

When the resol phenol formaldehyde resin D was used instead of the resorcinol formaldehyde resin B (Run No. 11), and when the resol phenol formaldehyde resin D was used instead of the novolak phenol formaldehyde resin A, the adhesive liquid exhibited only low bond strength. This is because the resol-type phenol formaldehyde resin does not possess heat-curing reactivity and has very low cohesive force.

On the other hand, adhesive liquids (Runs Nos. 13 and 14) containing the resorcinol formaldehyde resin E instead of the phenol formaldehyde resin A and those containing a blend of resins A and E instead of the resin A (Runs Nos. 15 and 16) and those containing phenol resorcinol formaldehyde resin F instead of resin A (Runs Nos. 17 and 18) exhibit lower bond strength than the adhesive liquids of the present invention. Especially when the terminal carboxyl group content of the polyester fibers and the constituents of the oil change, the bond strength of these adhesive liquids is extremely low. The adhesive liquid containing amonohydroxy benzene (phenol) having low polarity has good adhesion to polyester fibers. But a novolak resin containing a dihydroxybenzene (resorcinol) as a monomer component gives low adhesive to polyester fibers because of its low polarity.

It is necessary that the adhesive liquid of this invention should contain a suitable proportion of the rubber latex, and the adhesive liquid (Run No. 19) which does not contain a rubber latex (usually employed for bonding wood) shows only a very low bond strength.

Furthermore, those adhesive liquids in which the ratio of the amount of the rubber latex to the total amount of the novolak resin and resol resin is outside the range of the present invention (Runs Nos. 20 and 25) exhibit only low bond strength.

EXAMPLE 3

In the preparation of the novolak phenol-formaldehyde resin (solution A) in the adhesive (Run No. 4) in Example 2, the mol ratio of the formaldehyde to phenol and and the phenol component were varied. Otherwise, the procedure end conditions were same as in the preparation of the adhesive in Run No. 4 of Example 2. The results are given in Table II.

It can be seen from the results obtained that the phenol and formaldehyde should be reacted at the mole ratio specified above, and that the phenol compound should be a monohydroxy benzene or its derivative in which the number of the hydroxyl group is one per benzene ring in the molecule and which contain at least two functional groups, as specified hereinabove.

TABLE II

| Run No. | Phenol compound | Mol ratio of formaldehyde to phenol | H-test (kg./cm.) | | |
|---|---|---|---|---|---|
| | | | T1 | T2 | T3 |
| 26 | Phenol | 0.2 | 10.2 | 11.2 | 12.3 |
| 27 | do | 0.5 | 16.8 | 16.3 | 16.2 |
| 4 | do | 0.7 | 18.6 | 18.5 | 19.1 |
| 28 | do | 0.9 | 18.9 | 19.4 | 18.5 |
| 29 | do | 1.2 | Gelled | Gelled | Gelled |
| 30 | o-Cresol | 0.8 | 18.0 | 17.9 | 17.6 |
| 31 | m-Cresol | 0.8 | 18.3 | 18.8 | 18.5 |
| 32 | p-Cresol | 0.8 | 18.0 | 17.7 | 17.6 |
| 33 | p-Chlorophenol | 0.8 | 18.6 | 18.9 | 19.0 |
| 34 | 4,4'-dihydroxy biphenol | 0.9 | 17.3 | 17.7 | 18.2 |
| 35 | Bisphenol A | 0.9 | 18.8 | 17.9 | 18.5 |
| 36 | 3,4-xylenol | 0.8 | 17.0 | 16.6 | 17.3 |
| 37 | 2,4-xylenol | 0.8 | 10.3 | 8.6 | 9.9 |
| 13 | Resorcinol | 0.7 | 13.8 | 11.7 | 11.3 |
| 38 | Hexyl resorcinol | 0.7 | 14.3 | 14.6 | 12.8 |

EXAMPLE 4

In the preparation of the resol resorcinol-formaldehyde precondensate (solution B) in Run No. 4 in Example 2, the ratio of formaldehyde to resorcinol was varied. Otherwise, the procedure and conditions were the same as in Run No. 4 in Example 2. The results are given in Table III.

It is seen from the results obtained that the mol ratio of formaldehyde to resorcinol should be as specified hereinabove.

TABLE III

| Run number | Mol ratio of formaldehyde to resorcinol | H-test (kg./cm.) | | |
|---|---|---|---|---|
| | | T1 | T2 | T3 |
| 39 | 0.9 | Gelled | Gelled | Gelled |
| 40 | 1.2 | 17.3 | 18.9 | 18.4 |
| 4 | 1.5 | 18.6 | 18.5 | 19.1 |
| 41 | 1.8 | 18.8 | 19.1 | 18.4 |
| 42 | 2.3 | 17.2 | 16.8 | 17.1 |
| 43 | 3.0 | 17.0 | 16.2 | 16.4 |
| 44 | 5.0 | 16.3 | 16.0 | 16.8 |
| 45 | 7.0 | 13.2 | 14.5 | 14.7 |

EXAMPLE 5

The rubber latex component (C) was varied in Run No. 4 in Example 2. Otherwise, the procedure and conditions were the same as in Example 2, Run No. 4. The results are shown in Table IV.

It is seen from the results obtained that the adhesive liquids containing the rubber latex component specified in this invention and in the amount specified in this invention exhibited high bond strength.

TABLE IV

| Run No. | Type of rubber latex | Solids content of rubber latex (percent by weight) | H-test (kg./cm.) | | |
|---|---|---|---|---|---|
| | | | T1 | T2 | T3 |
| 46 | Hycar 2518FS® | 20 | 19.3 | 18.4 | 18.9 |
| 4 | {Hycar 2518FS® / Nipol LX-110®} | 14 / 6 | 18.6 | 18.5 | 19.1 |
| 47 | Nipol LX-110® | 20 | 16.5 | 16.3 | 16.3 |
| 48 | {Hycar 2518FS® / Natural rubber latex} | 14 / 6 | 18.3 | 18.8 | 18.5 |
| 49 | Natural rubber latex | 20 | 16.6 | 17.8 | 17.1 |
| 50 | {Hycar 2518FS® / Hycar 1562®} | 14 / 6 | 18.6 | 19.0 | 18.5 |
| | Hycar 1562® [1] | 20 | 17.0 | 16.6 | 16.8 |
| 51 | {Hycar 2518FS® / Geon 351® [2]} | 14 / 6 | 18.3 | 18.9 | 18.0 |
| 52 | | | | | |
| 53 | {Hycar 2518FS® / Neoprene 572® [3]} | 14 / 6 | 17.8 | 17.6 | 17.4 |

[1] 40 wt. percent acrylonitrile-butadiene copolymer latex.
[2] 55 wt. percent polyvinyl chloride latex.
[3] 50 wt. percent polychloroprene latex.

EXAMPLE 6

Run No. 4 in Example 2 was repeated except that polyethylene 2,6-naphthalate obtained by the method described in Japanese Patent Application No. 95,173/68 (filed Dec. 24, 1968) was used instead of the polyethylene terephthalate.

Furthermore, a tire cord of poly-ε-caprolactam (840 denier/2-ply, number of twists 47 x 47 turns/10 cm., oil pick-up about 0.8% by weight) was coated with the adhesive liquid obtained in Run No. 4 of this invention and RFL (Run No. 54) usually used, and dried for 2 minutes at 100° C., land then heat-treated for one minute at 200° C.

It can be seen from the results obtained that the adhesives of this invention exhibit excellent adhesion to polyesters other than polyethylene terephthalate and to polyamides.

Adhesive No. 54 (RFL)

| | |
|---|---|
| Resorcinol | 12.0 |
| Formalin (37 wt. percent) | 55.0 |
| Aqueous sodium hydroxide (10 wt. percent) | 7.0 |
| Water | 63.0 |
| Hycar 2518FS® (40 wt. percent) | 292.0 |
| Nipol LX-110® (40 wt. percent) | 126.0 |
| Water | 445.0 |
| Total | 1000.0 |

TABLE V

| Fibrous material | Terminal carboxyl content in polymer, g. eq./10⁶ gr. | Oil | Adhesive | H-test (kg./cm.) |
|---|---|---|---|---|
| Polyethylene terephthalate | 28 | X | No. 4 | 18.6 |
| Do | 28 | Y | No. 4 | 18.5 |
| Do | 18 | X | No. 4 | 19.1 |
| Polyethylene 2,6-naphthalate | 26 | X | No. 4 | 18.2 |
| Do | 26 | Y | No. 4 | 18.0 |
| Do | 15 | X | No. 4 | 18.1 |
| Poly-α-caprolactum | 23 | Y | No. 4 | 20.3 |
| Do | 23 | Y | No. 54 | 21.8 |

What we claim is:

1. A method of bonding a synthetic fibrous material to rubber, which comprises coating a synthetic fibrous material with an aqueous dispersion comprising (A) a novolak resin derived from 1 mol of a monohydroxy benzene having two or more functional groups or its derivative selected from the group consisting of:

phenols of formula (1)

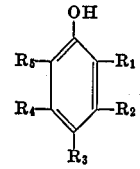

(1)

wherein each of $R_1$ through $R_5$ is a hydrogen atom, an alkyl group containing 1 to 15 carbon atoms, or a halogen atom, and at least two of $R_1$, $R_3$, and $R_5$ are hydrogen atoms; monohydroxy benzene derivatives of formula (2)

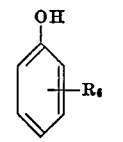

(2)

wherein $R_6$ is a group selected from a hydroxyphenol group and

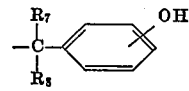

wherein each of $R_7$ and $R_8$ is a hydrogen atom or an alkyl group having 1 to 10 carbon atoms, in which the ratio of the number of benzene rings to that of hydroxyl groups in the molecule is 1:1, and from 0.3 to 1 mol of formaldehyde, (B) 0.05 to 1 part by weight per part of said resin (A), of a resole-type precondensate derived from 1 mol of resorcinol and 1 to 6 mols of formaldehyde, and (C) ½ to 9 parts by weight per part by weight of the sum of said resin (A) and precondensate (B), of a rubber latex, curing the coating at a temperature of at least 100° C. but not higher than the softening point of the fibrous material, and bonding the fibrous material to an unvulcanized rubber material while vulcanizing.

2. The method of claim 1, wherein said novolak-type resin (A) is one derived from 1 mol of said monohydroxy benzene or its derivative and 0.7 to 0.95 mol of formaldehyde, and wherein said resole-type precondensate (B) is a condensate derived from 1 mol of resorcinol and 1.2–2.0 mols of formaldehyde.

3. The method of claim 1, wherein the proportion of the precondensate (B) is 0.1 to 0.5 part per part by weight of the resin (A).

4. The method of claim 1, wherein the proportion of said rubber latex (C) is 1 to 3 parts by weight per part by weight of the sum of the resin (A) and the precondensate (B).

5. The method of claim 1, wherein the rubber latex (C) is selected from the group consisting of natural rubber latices, vinyl pyridine/styrene/butadiene copolymer latex, styrene/butadiene copolymer latex, butyl rubber latex, polybutadiene latex, acrylonitrile/butadiene copolymer latex, polychloroprene latex, carboxy-modified polybutadiene latex, hydroxy-modified polybutadiene latex and polyvinyl chloride latex.

6. The method of claim 1, wherein the rubber latex (C) is selected from the group consisting of vinyl pyridine/styrene/butadiene copolymer latex, and mixtures of said copolymer latex with natural rubber latex, styrene/butadiene copolymer latex, butyl rubber latex, polybutadiene latex, acrylonitrile/butadiene copolymer latex, polychloroprene latex, carboxy-modified polybutadiene latex, hydroxy-modified polybutadiene latex and polyvinyl chloride latex.

7. The method of claim 1 wherein the aqueous dispersion has a solids content of from 10 to 25% by weight.

8. The method of claim 1, wherein if $R_1$ through $R_5$ are alkyl groups, they contain 1 to 4 carbon atoms; if $R_1$ through $R_5$ are halogens, they are chlorine or bromine; and if $R_7$ and $R_8$ are alkyl groups, they contain 1 to 4 carbon atoms.

References Cited
UNITED STATES PATENTS

| | | | |
|---|---|---|---|
| 3,304,222 | 2/1967 | Wilken | 161—227 |
| 3,410,718 | 11/1968 | Smith | 117—138.8 |
| 3,547,729 | 12/1970 | Kibler | 156—331 |
| 3,597,379 | 8/1971 | VanValkenburg | 260—29.3 |
| 3,644,570 | 2/1972 | Jeffreys | 260—845 |
| 3,663,268 | 5/1972 | Wilson | 117—76 T |
| 3,663,491 | 5/1972 | Kibler | 260—29.3 |

CHARLES E. VAN HORN, Primary Examiner

R. A. DAWSON, Assistant Examiner

156—110 A, 338; 161—241, 248; 260—29.3, 845

U.S. Cl. X.R.

UNITED STATES PATENT OFFICE
CERTIFICATE OF CORRECTION

Patent No. 3,843,484          Dated October 22, 1974

Inventor(s)    Masaya KAMIYOSHI ET AL

It is certified that error appears in the above-identified patent and that said Letters Patent are hereby corrected as shown below:

In the Heading, insert patentees' Foreign Application Data as follows:

-- Japan    Application No. 46/45916, filed June 24, 1971

Japan    Application No. 46/46954, filed June 28, 1971.

Patentees hereby claim the priority of June 24, 1971. --

Signed and sealed this 10th day of December 1974.

(SEAL)
Attest:

McCOY M. GIBSON JR.                C. MARSHALL DANN
Attesting Officer                  Commissioner of Patents